(12) United States Patent
Lee et al.

(10) Patent No.: US 10,705,369 B2
(45) Date of Patent: Jul. 7, 2020

(54) LIQUID CRYSTAL DISPLAY DEVICE INCLUDING LIQUID CRYSTAL CAPSULE AND METHOD OF FABRICATING THE SAME

(71) Applicant: LG DISPLAY CO., LTD., Seoul (KR)

(72) Inventors: Eun-Woo Lee, Paju-si (KR); Min-Geun Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/188,840

(22) Filed: Nov. 13, 2018

(65) Prior Publication Data

US 2019/0155071 A1    May 23, 2019

(30) Foreign Application Priority Data

Nov. 20, 2017  (KR) ........................ 10-2017-0155010

(51) Int. Cl.
| | |
|---|---|
| G02F 1/1334 | (2006.01) |
| G02F 1/1343 | (2006.01) |
| G02F 1/1333 | (2006.01) |
| G02F 1/1335 | (2006.01) |
| G02F 1/13357 | (2006.01) |
| G02F 1/1362 | (2006.01) |

(52) U.S. Cl.
CPC ...... *G02F 1/1334* (2013.01); *G02F 1/133345* (2013.01); *G02F 1/133512* (2013.01); *G02F 1/133514* (2013.01); *G02F 1/133602* (2013.01); *G02F 1/134309* (2013.01); *G02F 1/136286* (2013.01); *G02F 2201/121* (2013.01); *G02F 2201/123* (2013.01); *G02F 2203/34* (2013.01)

(58) Field of Classification Search
CPC ..................................................... G02F 1/1334
See application file for complete search history.

(56) References Cited

U.S. PATENT DOCUMENTS

2015/0246487 A1   9/2015  El-Siblani
2017/0261778 A1*  9/2017  Lan ....................... G02F 1/1334

FOREIGN PATENT DOCUMENTS

KR    10-2014-0088471 A    10/2014

\* cited by examiner

*Primary Examiner* — James A Dudek
(74) *Attorney, Agent, or Firm* — Polsinelli PC

(57) ABSTRACT

A liquid crystal display device including: a substrate; a thin film transistor on the substrate; a pixel electrode and a common electrode on the substrate; a first liquid crystal pattern in the first sub-pixel on the pixel electrode and the common electrode, the first liquid crystal pattern including a first liquid crystal molecule; a second liquid crystal pattern in the second sub-pixel on the pixel electrode and the common electrode, the second liquid crystal pattern including a second liquid crystal molecule; and a third liquid crystal pattern in the third sub-pixel on the pixel electrode and the common electrode, the third liquid crystal pattern including a third liquid crystal molecule, wherein the first, second and third liquid crystal molecules have different refractive index anisotropies from each other.

10 Claims, 7 Drawing Sheets

LIQUID CRYSTAL DISPLAY DEVICE INCLUDING LIQUID CRYSTAL CAPSULE AND METHOD OF FABRICATING THE SAME

CROSS-REFERENCE TO RELATED APPLICATION

This application claims the benefit of priority of Korean Patent Application No. 10-2017-0155010, filed in the Republic of Korea on Nov. 20, 2017, which is hereby incorporated by reference in its entirety for all purposes as if fully set forth herein.

BACKGROUND

Field of the Disclosure

The present disclosure relates to a liquid crystal display device, and more particularly, to a liquid crystal display device where a transmission efficiency by color and a wavelength dispersity are improved by a liquid crystal molecule of a liquid crystal capsule of a liquid crystal layer having different refractive anisotropy by a sub-pixel and a method of fabricating the same.

Description of the Background

Recently, as the information age progresses, display devices processing and displaying a large amount of information have rapidly advanced. For example, various flat panel displays (FPDs) having a thin profile, a light weight and a low power consumption have been researched.

As a result, a thin film transistor liquid crystal display (TFT-LCD) device having an excellent color reproducibility and a thin profile has been developed. The LCD device displays an image using an optical anisotropy and a polarization property of a liquid crystal molecule.

In general, the LCD device includes first and second substrates facing and spaced apart from each other and a liquid crystal layer between the first and second substrates. Since the LCD device includes two glass substrates, the LCD device has a relatively heavy weight and a relatively bulky volume and it is not easy to apply the LCD device to a flexible display device.

To improve the above disadvantages of the LCD device, an LCD device including a liquid crystal capsule where a liquid crystal layer including a plurality of liquid crystal capsules is formed on a substrate through a coating method has been suggested. The LCD device including a liquid crystal capsule displays a gray level by changing an effective refractive index anisotropy (or an average refractive index anisotropy) according to an electric field.

FIG. 1 is a cross-sectional view showing a method of fabricating a liquid crystal display device including a liquid crystal capsule according to the related art.

In FIG. 1, a substrate 20 includes red, green and blue sub-pixels SPr, SPg and SPb, and a thin film transistor (TFT) T, a pixel electrode 38 and a common electrode 40 are formed in each of the red, green and blue sub-pixels SPr, SPg and SPb on the substrate 20.

A gate electrode 22 is formed in each of the red, green and blue sub-pixels SPr, SPg and SPb on the substrate 20, and a gate insulating layer 24 is formed on the gate electrode 22 in a whole of the substrate 20.

A semiconductor layer 26 is formed on the gate insulating layer 24 corresponding to the gate electrode 22, and a source electrode 28 and a drain electrode 30 are formed on both end portions of the semiconductor layer 26.

The gate electrode 22, the semiconductor layer 26, the source electrode 28 and the drain electrode 30 constitute the TFT T.

A passivation layer 32 is formed on the TFT T in a whole of the substrate 20, and a black matrix 34 is formed at a boundary portion of the red, green and blue sub-pixels SPr, SPg and SPb on the passivation layer 32.

Red, green and blue color filters 36r, 36g and 36b are formed in the red, green and blue sub-pixels SPr, SPg and SPb, respectively, on the black matrix 34. The red, green and blue color filters 36r, 36g and 36b constitute a color filter layer.

A pixel electrode 38 and a common electrode 40 are formed in each of the red, green and blue sub-pixels SPr, SPg and SPb on the color filter layer. The pixel electrode 38 is connected to the drain electrode 30 of the TFT T, and the common electrode 40 is spaced apart from the pixel electrode 38.

In addition, after a liquid crystal capsule material layer 72 is formed on the substrate 20 having the TFT T, the pixel electrode 38 and the common electrode 40 by coating a solution including a liquid crystal capsule 52 and a binder 54 through a nozzle 70, the liquid crystal capsule material layer 72 are dried or cured to form a liquid crystal layer 50 including the liquid crystal capsule 52 on the substrate 20. As a result, a liquid crystal display (LCD) device including a liquid crystal capsule according to the related art is completed.

Since a relatively low refractive index is induced in the LCD device including a liquid crystal capsule as compared with a refractive index of an in-plane switching (IPS) mode LCD device, a liquid crystal molecule of the LCD device including a liquid crystal capsule has a refractive index anisotropy (Δn) greater than a refractive index anisotropy of a liquid crystal molecule of a twisted nematic (TN) LCD device.

However, as a refractive index anisotropy of a liquid crystal molecule increases, a wavelength dispersity increases.

FIG. 2 is a graph showing a wavelength dispersity of an in-plane switching mode liquid crystal display device and a liquid crystal display device including a liquid crystal capsule according to the related art.

In FIG. 2, a first curve C1 represents a wavelength dispersity of a twisted nematic (TN) liquid crystal display (LCD) device according to the related art, and second and third curves C2 and C3 represent a wavelength dispersity of a liquid crystal display (LCD) device including a liquid crystal capsule according to the related art. The TN LCD device corresponds to an in-plane switching (IPS) mode LCD device, and the LCD devices of the second and third curves C2 and C3 are driven by voltages of about 25V and about 50V, respectively.

According to the first curve C1, transmittances at wavelengths corresponding to blue, green and red colors (e.g., about 450 nm, about 550 nm and about 650 nm, respectively) are about 0.80, about 0.95 (a maximum transmittance) and about 0.85, respectively. As a result, in the IPS mode LCD device according to the related art, a difference in the transmittance of the green and blue colors is about 0.15 and a difference in the transmittance of the green and red colors is about 0.10 (a maximum transmittance difference is about 0.15).

According to the second curve C2, transmittances at wavelengths corresponding to blue, green and red colors (e.g., about 450 nm, about 550 nm and about 650 nm, respectively) are about 0.90, about 0.80 and about 0.55, respectively, and a transmittance at wavelength corresponding to a fourth color (e.g., about 470 nm) between the blue and green colors is about 0.95. As a result, in the LCD device including the liquid crystal capsule according to the related art driven by a voltage of about 25V, a difference in the transmittance of the fourth color and the blue color is about 0.05, a difference in the transmittance of the fourth color and the green color is about 0.15, and a difference in the transmittance of the fourth color and the red color is about 0.40 (a maximum transmittance difference is about 0.40).

According to the third curve C3, transmittances at wavelengths corresponding to blue, green and red colors (e.g., about 450 nm, about 550 nm and about 650 nm, respectively) are about 0.60, about 0.95 (a maximum transmittance) and about 0.70, respectively. As a result, in the LCD device including the liquid crystal capsule according to the related art driven by a voltage of about 50V, a difference in the transmittance of the green and blue colors is about 0.35 and a difference in the transmittance of the green and red colors is about 0.25 (a maximum transmittance difference is about 0.35).

When the refractive index anisotropy (Δn) of the liquid crystal molecule increases from about 0.1 to about 0.25, the wavelength dispersity of the liquid crystal molecule increases and the transmittance difference among the red, green and blue colors increases.

Accordingly, a white balance of the LCD device collapses. For example, when the green color has the maximum transmittance, the transmittances of the blue and red colors are reduced. As a result, the white color coordinate is changed and a display quality of an image displayed by the LCD device is deteriorated.

To compensate the white balance, an independent driving method where a backlight unit, a color filter and a data voltage are independently driven in red, green and blue sub-pixels has been suggested.

However, since the independent driving method requires an additional circuit design for supplying a driving voltage of the backlight unit or the data voltage to the red, green and blue sub-pixels individually or an additional fabrication process for adjusting a transmittance property of red, green and blue color filters, a fabrication cost increases.

SUMMARY

Accordingly, aspects of the present disclosure are directed to a liquid crystal display device including a liquid crystal capsule and a method of fabricating the same that substantially obviate one or more of the problems due to limitations and disadvantages of the related art.

Aspects of the present disclosure relate to a liquid crystal display device including a liquid crystal capsule where a display quality is improved.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a liquid crystal display device including: a substrate having first, second and third sub-pixels; a thin film transistor in each of the first, second and third sub-pixels on the substrate; a pixel electrode and a common electrode in each of the first, second and third sub-pixels on the substrate, the pixel electrode and the common electrode spaced apart from each other; a first liquid crystal pattern in the first sub-pixel on the pixel electrode and the common electrode, the first liquid crystal pattern including a first liquid crystal capsule having a first liquid crystal molecule, a first color resin and a first binder where the first liquid crystal capsule and the first color resin are dispersed; a second liquid crystal pattern in the second sub-pixel on the pixel electrode and the common electrode, the second liquid crystal pattern including a second liquid crystal capsule having a second liquid crystal molecule, a second color resin and a second binder where the second liquid crystal capsule and the second color resin are dispersed; and a third liquid crystal pattern in the third sub-pixel on the pixel electrode and the common electrode, the third liquid crystal pattern including a third liquid crystal capsule having a third liquid crystal molecule, a third color resin and a third binder where the third liquid crystal capsule and the third color resin are dispersed, wherein the first, second and third liquid crystal molecules have different refractive index anisotropies from each other.

In another aspect, a method of fabricating a liquid crystal display device including: forming a thin film transistor in each of first, second and third sub-pixels on a substrate; forming a pixel electrode and a common electrode in each of the first, second and third sub-pixels on the substrate, the pixel electrode and the common electrode spaced apart from each other; forming a first liquid crystal pattern in the first sub-pixel on the pixel electrode and the common electrode by selectively irradiating an ultraviolet ray onto a first liquid crystal capsule solution of the first sub-pixel of the substrate in the first liquid crystal capsule solution including a first liquid crystal capsule, a first color resin, a first binder and a photoinitiator; forming a second liquid crystal pattern in the second sub-pixel on the pixel electrode and the common electrode by selectively irradiating an ultraviolet ray onto a second liquid crystal capsule solution of the second sub-pixel of the substrate in the second liquid crystal capsule solution including a second liquid crystal capsule, a second color resin, a second binder and a photoinitiator; and forming a third liquid crystal pattern in the third sub-pixel on the pixel electrode and the common electrode by selectively irradiating an ultraviolet ray onto a third liquid crystal capsule solution of the third sub-pixel of the substrate in the third liquid crystal capsule solution including a third liquid crystal capsule, a third color resin, a third binder and a photoinitiator.

It is to be understood that both the foregoing general description and the following detailed description are explanatory, and are intended to provide further explanation of the aspects as claimed.

BRIEF DESCRIPTION OF THE DRAWINGS

The accompanying drawings, which are included to provide a further understanding of the disclosure, are incorporated in and constitute a part of this application, illustrate aspects of the disclosure and together with the description serve to explain the principles of the disclosure.

In the drawings.

DETAILED DESCRIPTION

Figure 1:
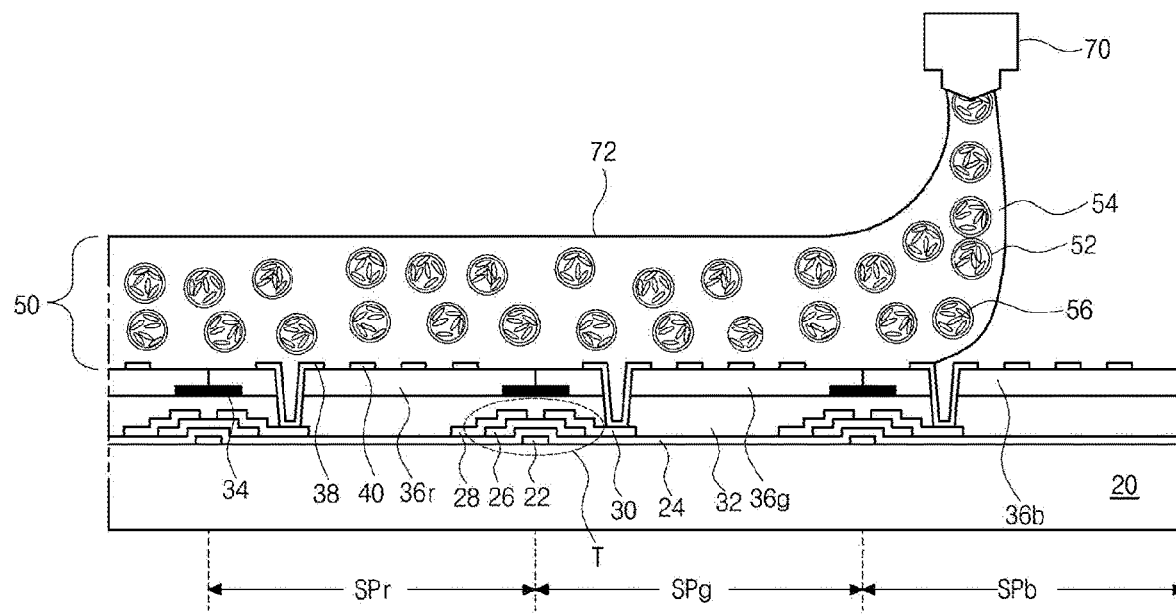
FIG. 1 is a plan view showing a method of fabricating a liquid crystal display device including a liquid crystal capsule according to the related art.
Figure 2:
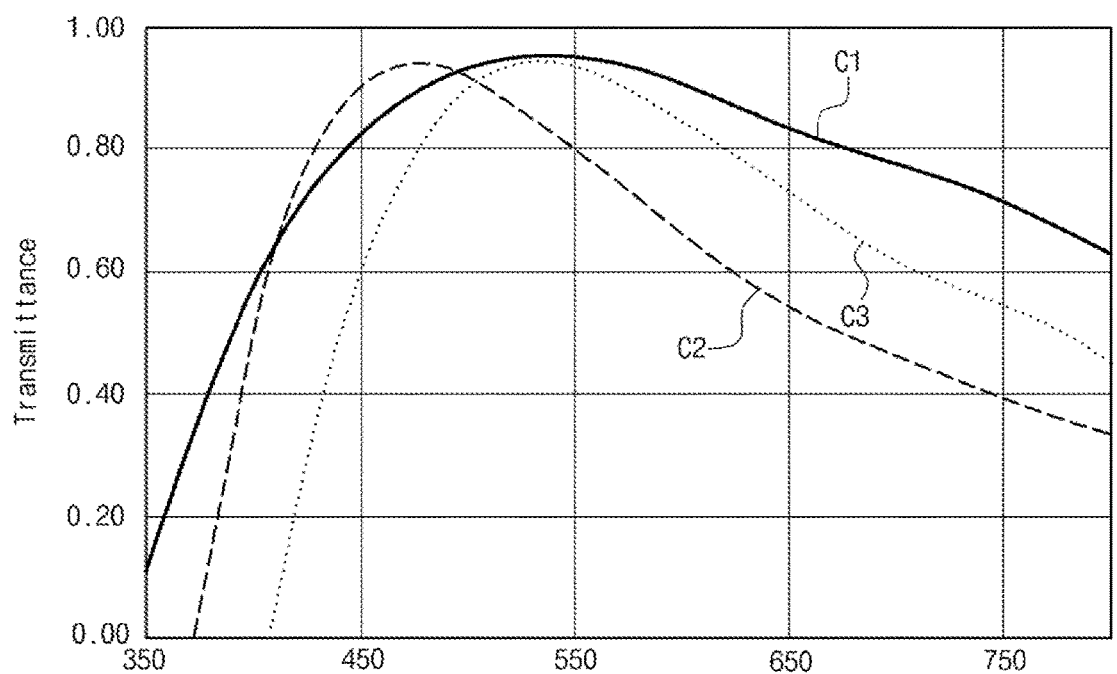
FIG. 2 is a graph showing a wavelength dispersity of an in-plane switching mode liquid crystal display device and a liquid crystal display device including a liquid crystal capsule according to the related art.

Reference will now be made in detail to aspects of the present disclosure, examples of which are illustrated in the accompanying drawings. In the following description, when a detailed description of well-known functions or configurations related to this document is determined to unnecessarily cloud a gist of an aspect of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 3:
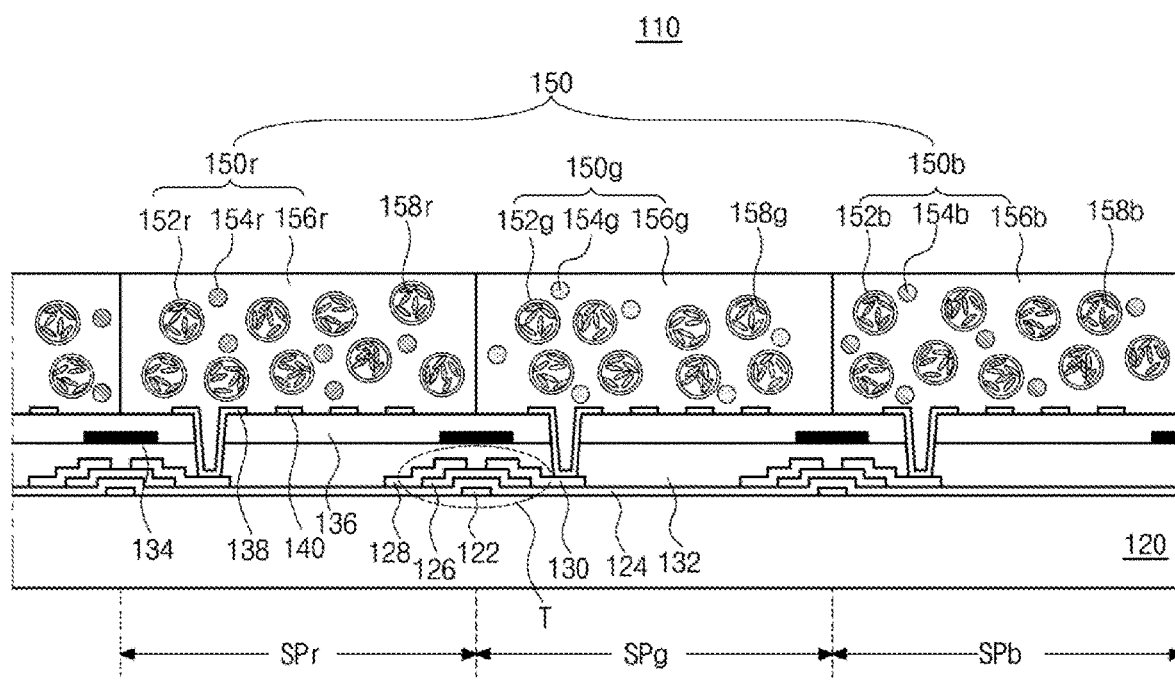
FIG. 3 is a cross-sectional view showing a liquid crystal display device including a liquid crystal capsule according to an aspect of the present disclosure.

FIG. 3 is a cross-sectional view showing a liquid crystal display device including a liquid crystal capsule according to an aspect of the present disclosure.

In FIG. 3, a liquid crystal display (LCD) device 110 including a liquid crystal capsule according to an aspect of the present disclosure includes a substrate 120 and a liquid crystal layer 150 on the substrate 120.

The substrate 120 includes first, second and third sub-pixels SPr, SPg and SPb. The first, second and third sub-pixels SPr, SPg and SPb may correspond to red, green and blue, respectively or cyan, magenta and yellow, respectively.

A gate electrode 122 is formed in each of the first, second and third sub-pixels SPr, SPg and SPb on the substrate 120, and a gate insulating layer 124 is formed on the gate electrode 122 including the substrate 120.

A semiconductor layer 126 is formed on the gate insulating layer 124 corresponding to the gate electrode 122, and a source electrode 128 and a drain electrode 130 are disposed on both end portions of the semiconductor layer 126.

The gate electrode 122, the semiconductor layer 126, the source electrode 128 and the drain electrode 130 constitute a thin film transistor (TFT) T.

Although not shown, a gate line and a data line are disposed over the substrate 120. The gate line and the data line cross each other to define the first, second and third sub-pixels SPr, SPg and SPb. The gate electrode 122 of the TFT T may be connected to the gate line and the source electrode 128 of the TFT T may be connected to the data line.

A passivation layer 132 is disposed on the TFT T in a whole of the substrate 120, and a black matrix 134 is disposed at a boundary portion of the first, second and third sub-pixels SPr, SPg and SPb on the passivation layer 132.

A planarization layer 136 is disposed on the black matrix 134 in a whole of the substrate 120, and a pixel electrode 138 and a common electrode 140 are disposed in each of the first, second and third sub-pixels SPr, SPg and SPb on the planarization layer 136. The pixel electrode 138 is connected to the drain electrode 130 of the TFT T through a drain contact hole of the planarization layer 136 and the passivation layer 132. The common electrode 140 is spaced apart from the pixel electrode 138.

Although not shown, each of the pixel electrode 138 and the common electrode 140 may have a bar shape and may include a plurality of bars parallel to and spaced apart from each other in each of the first, second and third sub-pixels SPr, SPg and SPb.

First, second and third liquid crystal patterns 150r, 150g and 150b are disposed in the first, second and third sub-pixels SPr, SPg and SPb, respectively, on the pixel electrode 138 and the common electrode 140. The first, second and third liquid crystal patterns 150r, 150g and 150b constitute the liquid crystal layer 150. For example, the liquid crystal layer 150 may have a thickness within a range of about 1 μm to about 4 μm.

The first liquid crystal pattern 150r in the first sub-pixel SPr includes a plurality of first liquid crystal capsules 152r, a plurality of first color resins 154r and a first binder 156r where the plurality of first liquid crystal capsules 152r and the plurality of first color resins 154r are dispersed, and each of the plurality of first liquid crystal capsules 152r includes a plurality of first liquid crystal molecules 158r.

The second liquid crystal pattern 150g in the second sub-pixel SPg includes a plurality of second liquid crystal capsules 152g, a plurality of second color resins 154g and a second binder 156g where the plurality of second liquid crystal capsules 152g and the plurality of second color resins 154g are dispersed, and each of the plurality of second liquid crystal capsules 152g includes a plurality of second liquid crystal molecules 158g.

The third liquid crystal pattern 150b in the third sub-pixel SPb includes a plurality of third liquid crystal capsules 152b, a plurality of third color resins 154b and a third binder 156b where the plurality of third liquid crystal capsules 152b and the plurality of third color resins 154b are dispersed, and each of the plurality of third liquid crystal capsules 152b includes a plurality of third liquid crystal molecules 158b.

Each of the plurality of first liquid crystal capsules 152r, the plurality of second liquid crystal capsules 152g and the plurality of third liquid crystal capsules 152b is a polymer capsule having a diameter of 1 to 999 nanometers and includes a water soluble material such as poly vinyl alcohol (PVA) or a fat soluble material such as poly methyl methacrylate (PMMA).

For example, each of the plurality of first liquid crystal capsules 152r, the plurality of second liquid crystal capsules 152g and the plurality of third liquid crystal capsules 152b may have a diameter within a range of about 1 nm to about 320 nm. In addition, the plurality of first liquid crystal capsules 152r, the plurality of second liquid crystal capsules 152g and the plurality of third liquid crystal capsules 152b may include the same material as each other.

Each of the plurality of first color resins 154r, the plurality of second color resins 154g and the plurality of third color resins 154b has a photo-curing property and transmits a light of a selected wavelength. For example, the plurality of first color resins 154r may selectively transmit a light of a red color, the plurality of second color resins 154g may selectively transmit a light of a green color, and the plurality of third color resins 154b may selectively transmit a light of a blue color.

The first, second and third binders 156r, 156g and 156b may be transparent or translucent (or half-transparent) and may have a water solubility, a fat solubility or a mixed property of a water solubility and a fat solubility. For example, the first, second and third binders 156r, 156g and 156b may have the same material.

The plurality of first liquid crystal molecules 158r, the plurality of second liquid crystal molecules 158g and the plurality of third liquid crystal molecules 158b may include at least one of a nematic liquid crystal, a ferroelectric liquid crystal and a flexo electric liquid crystal.

The first, second and third liquid crystal molecules 158r, 158g and 158b have a different refractive index anisotropy ($\Delta n$) from each other, and the refractive index anisotropies ($\Delta n$) of the first, second and third liquid crystal molecules 158r, 158g and 158b may be proportional to wavelengths of colors corresponding to the first, second and third sub-pixels SPr, SPg and SPb, respectively.

A second refractive index anisotropy ($\Delta n2$) of the second liquid crystal molecule 158g corresponding to the green color may be smaller than a first refractive index anisotropy ($\Delta n1$) of the first liquid crystal molecule 158r and may be greater than a third refractive index anisotropy ($\Delta n3$) of the third liquid crystal molecule 158b. ($\Delta n1 > \Delta n2 > \Delta n3$)

For example, the first refractive index anisotropy ($\Delta n1$) corresponding to the red color may be greater than 0.25 ($\Delta n1 > 0.25$), the second refractive index anisotropy ($\Delta n2$) corresponding to the green color may be 0.25 ($\Delta n2 = 0.25$), and the third refractive index anisotropy ($\Delta n3$) corresponding to the blue color may be smaller than 0.25 ($\Delta n3 < 0.25$).

Since the first liquid crystal pattern 150r including the plurality of first liquid crystal capsules 152r, the plurality of first color resins 154r and the first binder 156r, the second liquid crystal pattern 150g including the plurality of second liquid crystal capsules 152g, the plurality of second color resins 154g and the second binder 156g and the third liquid crystal pattern 150b including the plurality of third liquid crystal capsules 152b, the plurality of third color resins 154b and the third binder 156b may be formed without an additional orientation layer, the first, second and third liquid crystal patterns 150r, 150g and 150b may directly contact the pixel electrode 138 and the common electrode 140.

The liquid crystal layer 150 including the first, second and third liquid crystal patterns 150r, 150g and 150b may be formed through a liquid phase stereolithography method using first, second and third liquid crystal capsule solutions.

Figure 4A:
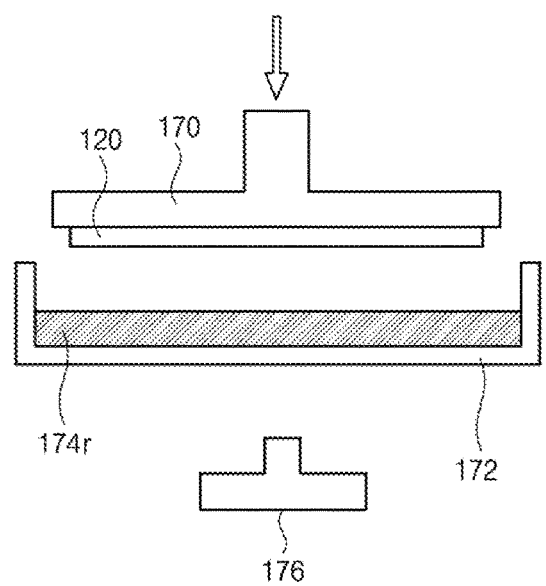
FIGS. 4A to 4I are cross-sectional views showing a method of fabricating a liquid crystal display device including a liquid crystal capsule according to an aspect of the present disclosure.
Figure 4B:
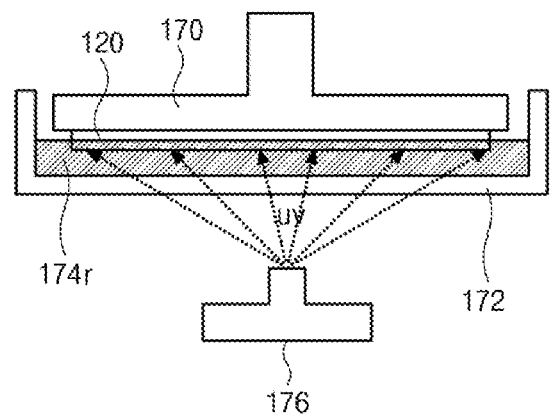
Figure 4C:
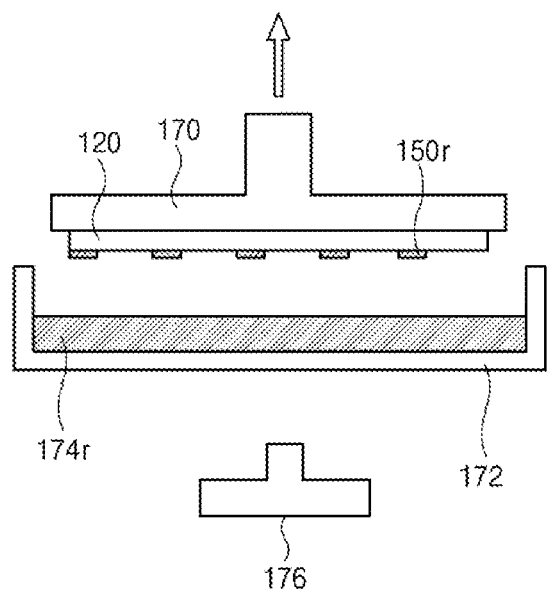
Figure 4D:
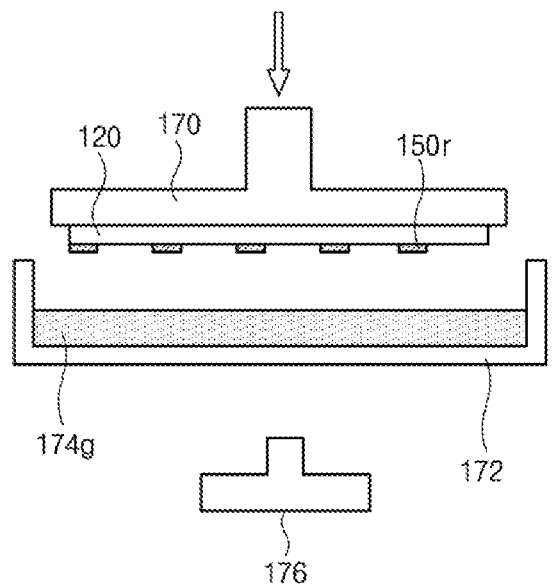
Figure 4E:
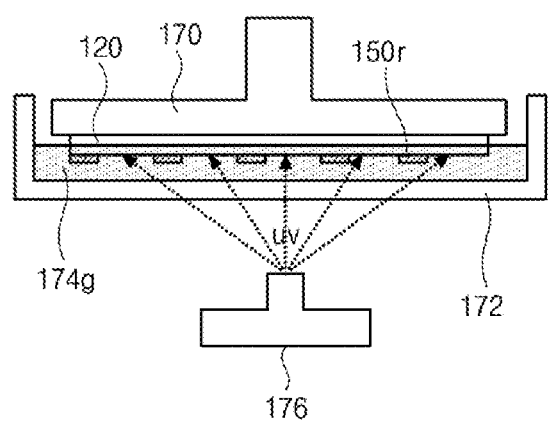
Figure 4F:
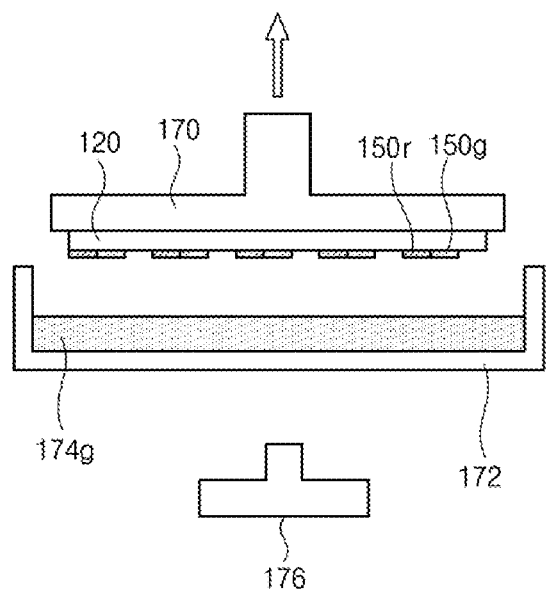
Figure 4G:
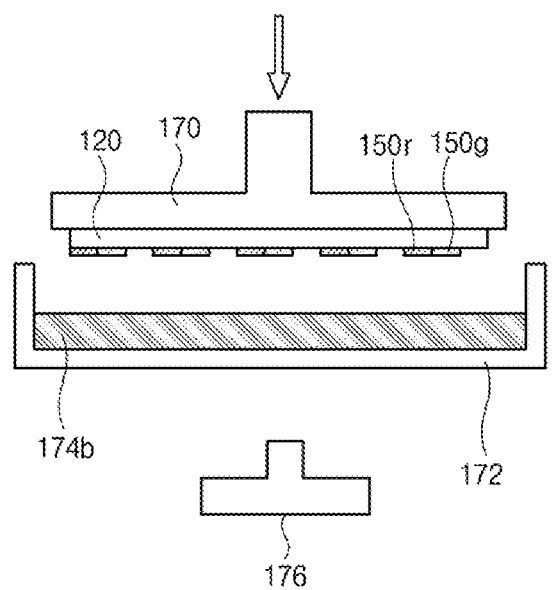
Figure 4H:
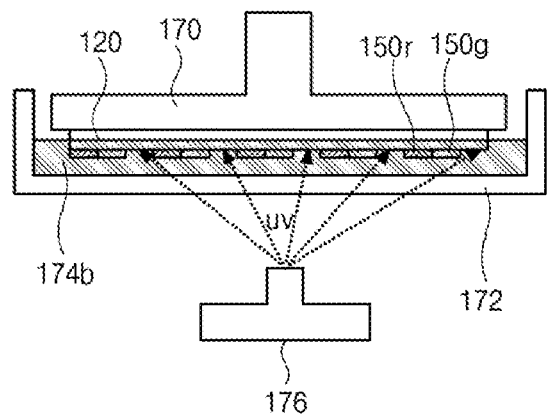
Figure 4I:
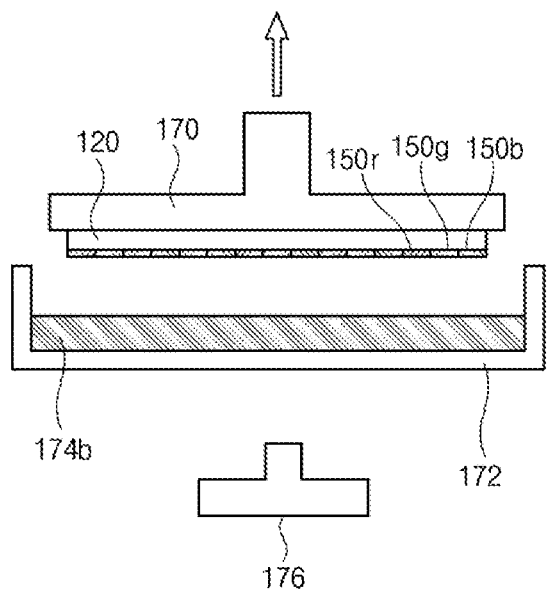
Figure 5:
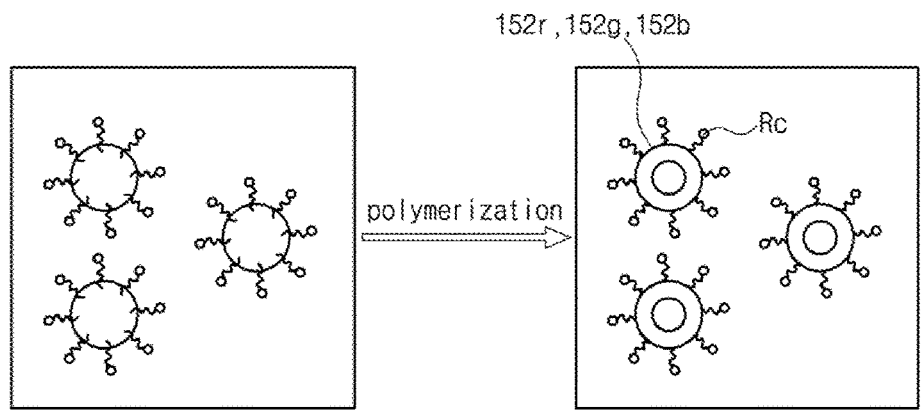
FIG. 5 is a view showing a method of forming a liquid crystal capsule according to an aspect of the present disclosure.
Figure 6:
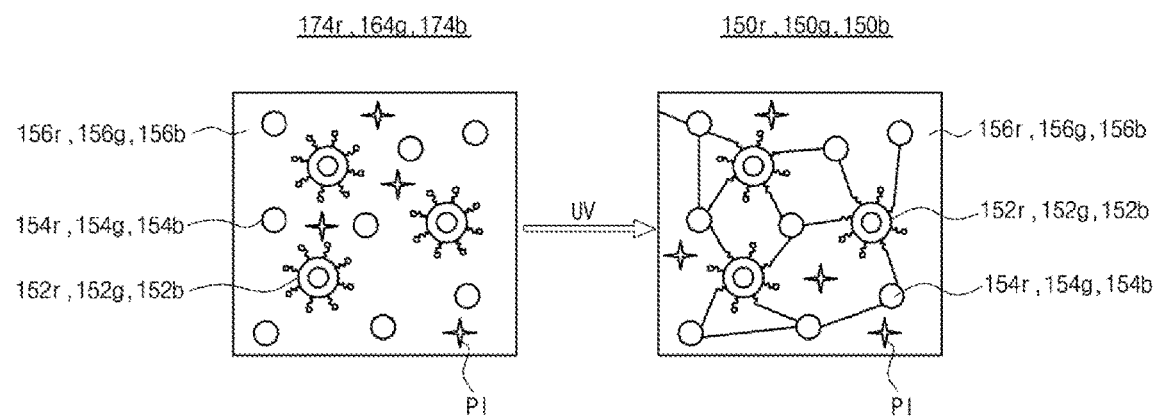
FIG. 6 is a view showing a method of photo-curing a liquid crystal capsule solution according to an aspect of the present disclosure.
Figure 7:
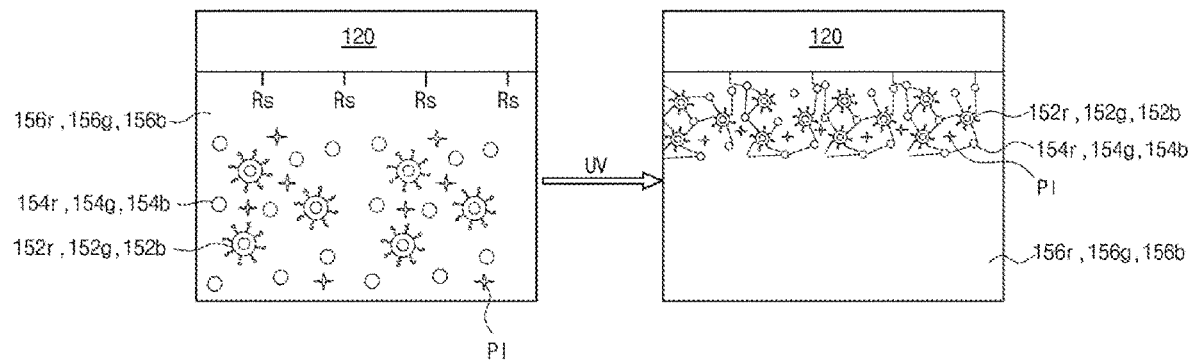
FIG. 7 is a view showing a method of adsorbing a liquid crystal capsule solution to a substrate according to an aspect of the present disclosure.

FIGS. 4A to 4I are cross-sectional views showing a method of fabricating a liquid crystal display device including a liquid crystal capsule according to an aspect of the present disclosure, FIG. 5 is a view showing a method of forming a liquid crystal capsule according to an aspect of the present disclosure, FIG. 6 is a view showing a method of photo-curing a liquid crystal capsule solution according to an aspect of the present disclosure, and FIG. 7 is a view showing a method of adsorbing a liquid crystal capsule solution to a substrate according to an aspect of the present disclosure. Reference is made to FIG. 3 with FIGS. 4A to 4I, 5, 6 and 7.

In FIG. 4A, the substrate 120 having the TFT T, the pixel electrode 128 and the common electrode 130 is attached to a stage 170. A tank 172 having a first liquid crystal capsule solution 174r is disposed under the stage 170, and a light source 176 is disposed under the tank 172.

In FIG. 5, when the first, second and third liquid crystal capsules 152r, 152g and 152b are formed through a polymerization of a source material, the first, second and third liquid crystal capsules 152r, 152g and 152b and the first, second and third color resins 154r, 154g and 154b may be easily polymerized by combining a capsule reactor Rc with an outer shell of each of the first, second and third liquid crystal capsules 152r, 152g and 152b. The capsule reactor Rc may be combined with the outer shell through a mini-emulsion method using a material directly participating in a shell formation such as a hydrophilic monomer or a reactive surfactant. For example, the capsule reactor Rc may be one of —NH and —OH.

In FIG. 4B, while the substrate 120 is immersed in the first liquid crystal capsule solution 174r of the tank 172 by moving the stage 170 downwardly, an ultraviolet (UV) ray of the light source 176 is selectively irradiated onto the first liquid crystal capsule solution 174r of the first sub-pixel SPr of the substrate 120.

In FIG. 6, the first liquid crystal capsule solution 174r includes the first liquid crystal capsule 152r, the first color resin 154r, the first binder 156r and a photoinitiator PI, the second liquid crystal capsule solution 174g includes the second liquid crystal capsule 152g, the second color resin 154g, the second binder 156g and a photoinitiator PI, and the third liquid crystal capsule solution 174b includes the third liquid crystal capsule 152b, the third color resin 154b, the third binder 156b and a photoinitiator PI. When the UV ray is irradiated onto the first, second and third liquid crystal capsule solutions 174r, 174g and 174b, a curing reaction occurs between the first, second and third liquid crystal capsules 152r, 152g and 152b and the first, second and third color resins 154r, 154g and 154b to polymerize the first, second and third liquid crystal capsule solutions 174r, 174g and 174b.

When the UV ray is irradiated onto the first liquid crystal capsule solution 174r, a cross-link reaction occurs between the photoinitiator PI and the first color resin 154r to cause a curing reaction between the first liquid crystal capsule 152r and the first color resin 154r. As a result, the first liquid crystal capsule 152r and the first color resin 154r are polymerized to be adsorbed to the substrate 120.

In FIG. 4C, the substrate 120 is extracted from the first liquid crystal capsule solution 174r of the tank 172 by moving the stage 170 upwardly. The first liquid crystal pattern 150r including the first liquid crystal capsule 152r, the first color resin 154r and the first binder 156r is selectively formed in the first sub-pixel SPr on the substrate 120.

In FIG. 7, a surface of the substrate 120 may be reformed with a substrate reactor Rs so that the first, second and third liquid crystal capsules 152r, 152g and 152b and the first, second and third color resins 154r, 154g and 154b polymerized by the UV ray can be easily adsorbed to the substrate 120. For example, the substrate reactor Rs may be one of —CH$_2$=CH$_2$, OH and —NH$_2$.

In FIG. 4D, the substrate 120 having the first liquid crystal pattern 150r is attached to the stage 170. The tank 172 having a second liquid crystal capsule solution 174g is disposed under the stage 170, and the light source 176 is disposed under the tank 172.

In FIG. 4E, while the substrate 120 is immersed in the second liquid crystal capsule solution 174g of the tank 172 by moving the stage 170 downwardly, the UV ray of the light source 176 is selectively irradiated onto the second liquid crystal capsule solution 174g of the second sub-pixel SPg of the substrate 120.

When the UV ray is irradiated onto the second liquid crystal capsule solution 174g, the cross-link reaction occurs between the photoinitiator PI and the second color resin 154g to cause the curing reaction between the second liquid crystal capsule 152g and the second color resin 154g. As a result, the second liquid crystal capsule 152g and the second color resin 154g are polymerized to be adsorbed to the substrate 120.

In FIG. 4F, the substrate 120 is extracted from the second liquid crystal capsule solution 174g of the tank 172 by moving the stage 170 upwardly. The second liquid crystal pattern 150g including the second liquid crystal capsule 152g, the second color resin 154g and the second binder 156g is selectively formed in the second sub-pixel SPg on the substrate 120.

In FIG. 4G, the substrate 120 having the first and second liquid crystal pattern 150r and 150g is attached to the stage 170. The tank 172 having a third liquid crystal capsule solution 174b is disposed under the stage 170, and the light source 176 is disposed under the tank 172.

In FIG. 4H, while the substrate 120 is immersed in the third liquid crystal capsule solution 174b of the tank 172 by moving the stage 170 downwardly, the UV ray of the light source 176 is selectively irradiated onto the third liquid crystal capsule solution 174b of the third sub-pixel SPb of the substrate 120.

When the UV ray is irradiated onto the third liquid crystal capsule solution 174b, the cross-link reaction occurs between the photoinitiator PI and the third color resin 154b to cause the curing reaction between the third liquid crystal capsule 152b and the third color resin 154b. As a result, the third liquid crystal capsule 152b and the third color resin 154b are polymerized to be adsorbed to the substrate 120.

In FIG. 4I, the substrate 120 is extracted from the third liquid crystal capsule solution 174b of the tank 172 by moving the stage 170 upwardly. The third liquid crystal pattern 150b including the third liquid crystal capsule 152b, the third color resin 154b and the third binder 156b is selectively formed in the third sub-pixel SPb on the substrate 120.

As a result, the LCD device 110 including the liquid crystal capsule is completed by forming the liquid crystal layer 150 including the first, second and third liquid crystal patterns 150r, 150g and 150b through the liquid phase stereolithography method.

Consequently, in the liquid crystal display device 110 including the liquid crystal capsule according to the present disclosure, since the liquid crystal layer 150 is formed in the first, second and third sub-pixels SPr, SPg and SPb displaying different colors by using the first, second and third liquid crystal capsules 152r, 152g and 152b including the first, second and third liquid crystal molecules 158r, 158g and 158b having different refractive index anisotropies, a uniformity of a normalized transmittance by a color is improved, a wavelength dispersity is reduced and a white coordinate is compensated. As a result, a display quality of an image is improved.

In addition, since the liquid crystal layer 150 is formed by using the first, second and third liquid crystal capsules 152r, 152g and 152b including the first, second and third liquid crystal molecules 158r, 158g and 158b having different refractive index anisotropies through a liquid phase stereolithography method, a fabrication process is simplified and a fabrication cost is reduced.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A liquid crystal display device, comprising:
a substrate having first, second and third sub-pixels;
a thin film transistor in each of the first, second and third sub-pixels on the substrate;
a pixel electrode and a common electrode in each of the first, second and third sub-pixels on the substrate, the pixel electrode and the common electrode spaced apart from each other;
a first liquid crystal pattern in the first sub-pixel on the pixel electrode and the common electrode, the first liquid crystal pattern including a first liquid crystal capsule having a first liquid crystal molecule, a first color resin and a first binder where the first liquid crystal capsule and the first color resin are dispersed;
a second liquid crystal pattern in the second sub-pixel on the pixel electrode and the common electrode, the second liquid crystal pattern including a second liquid crystal capsule having a second liquid crystal molecule, a second color resin and a second binder where the second liquid crystal capsule and the second color resin are dispersed; and
a third liquid crystal pattern in the third sub-pixel on the pixel electrode and the common electrode, the third liquid crystal pattern including a third liquid crystal capsule having a third liquid crystal molecule, a third color resin and a third binder where the third liquid crystal capsule and the third color resin are dispersed,
wherein the first, second and third liquid crystal molecules have different refractive index anisotropies from one another.

2. The display device of claim 1, wherein the refractive index anisotropies of the first, second and third liquid crystal molecules are proportional to a wavelength of color corresponding to the first, second and third sub-pixels, respectively.

3. The display device of claim 1, wherein the first, second and third sub-pixels correspond to red, green and blue colors, respectively.

4. The display device of claim 1, wherein a capsule reactor for polymerization of the first, second and third liquid crystal capsules and the first, second and third color resins is combined at an outer shell of the each of the first, second and third liquid crystal capsules, and
wherein a substrate reactor for adsorption of the polymerized first, second and third liquid crystal capsules and the first, second and third color resins is combined at a surface of the substrate.

5. The display device of claim 4, wherein the capsule reactor is —NH or —OH, and the substrate reactor is —CH$_2$=CH$_2$, OH or —NH$_2$.

6. A liquid crystal display device including a substrate where first, second and third sub-pixels are defined, comprising:
a first liquid crystal pattern disposed in the first sub-pixel and including a first liquid crystal capsule having a first liquid crystal molecule having a first refractive index anisotropy, a first color resin and a first binder where the first liquid crystal capsule and the first color resin are dispersed;

a second liquid crystal pattern disposed in the second sub-pixel and the second liquid crystal pattern including a second liquid crystal capsule having a second liquid crystal molecule having a second refractive index anisotropy, a second color resin and a second binder where the second liquid crystal capsule and the second color resin are dispersed; and a third liquid crystal pattern disposed in the third sub-pixel and the third liquid crystal pattern including a third liquid crystal capsule having a third liquid crystal molecule having a third refractive index anisotropy, a third color resin and a third binder where the third liquid crystal capsule and the third color resin are dispersed, wherein the first, second and third refractive index anisotropies are different from one other to reduce deviation in normalized transmittance by color and dispersity in a wavelength of color.

7. The display device of claim 6, wherein the first, second and third refractive index anisotropies are proportional to the wavelength of color corresponding to the first, second and third sub-pixels, respectively.

8. The display device of claim 6, wherein the first, second and third sub-pixels correspond to red, green and blue colors, respectively.

9. The display device of claim 6, wherein a capsule reactor for polymerization of the first, second and third liquid crystal capsules and the first, second and third color resins is combined at an outer shell of the each of the first, second and third liquid crystal capsules, and wherein a substrate reactor for adsorption of the polymerized first, second and third liquid crystal capsules and the first, second and third color resins is combined at a surface of the substrate.

10. The display device of claim 9, wherein the capsule reactor is —NH or —OH, and the substrate reactor is —$CH_2$=$CH_2$, OH or —$NH_2$.

* * * * *